US008903638B2

(12) United States Patent
Lin et al.

(10) Patent No.: US 8,903,638 B2
(45) Date of Patent: Dec. 2, 2014

(54) WARNING METHOD AND SYSTEM FOR DETECTING LANE-CHANGING CONDITION OF REAR-APPROACHING VEHICLES

(75) Inventors: Che-Chung Lin, Hsinchu (TW); Yu-Chen Lin, Taipei (TW); Ming-Jen Tu, Taipei (TW); Li-Fen Liu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 440 days.

(21) Appl. No.: 13/480,070

(22) Filed: May 24, 2012

(65) Prior Publication Data

US 2013/0050491 A1 Feb. 28, 2013

(30) Foreign Application Priority Data

Aug. 26, 2011 (TW) .............................. 100130747 A

(51) Int. Cl.
 *G06F 17/10* (2006.01)
 *G08G 1/0962* (2006.01)
 *G06K 9/00* (2006.01)
 *G06K 9/20* (2006.01)
 *B60Q 9/00* (2006.01)
 *H04N 7/18* (2006.01)

(52) U.S. Cl.
 CPC .......... *G08G 1/0962* (2013.01); *G06K 9/00791* (2013.01); *G06K 9/2054* (2013.01); *B60Q 9/008* (2013.01); *H04N 7/18* (2013.01)
 USPC ............................ 701/301; 340/435; 348/148

(58) Field of Classification Search
 CPC ... B60Q 9/008; B60Q 9/006; B60W 2550/20; B60W 2550/402; B60W 50/16; B60W 30/16; B60W 2550/308; B60W 30/18163; G06K 9/00791; G06K 9/2054; G08G 1/0962; G08G 1/16; G08G 1/167; G08G 1/09623; G08G 1/09626

USPC ............... 348/148; 340/425.5, 435, 461, 903, 340/988, 438, 475; 701/41, 28, 301, 523
See application file for complete search history.

(56) References Cited

U.S. PATENT DOCUMENTS 6,172,600 B1  1/2001  Kakinami et al.
6,218,960 B1  4/2001  Ishikawa et al.
(Continued)

FOREIGN PATENT DOCUMENTS

EP  2264683 A1  12/2010
JP  2287799 A   11/1990
(Continued)

OTHER PUBLICATIONS

Taiwan Patent Office, Office Action, Patent Application Serial No. TW100130747, Sep. 16, 2013, Taiwan.

(Continued)

*Primary Examiner* — Sath V Perungavoor
*Assistant Examiner* — Nathnael Aynalem
(74) *Attorney, Agent, or Firm* — Rabin & Berdo, P.C.

(57) ABSTRACT

A warning method and system for detecting lane-changing condition of rear-approaching vehicles are disclosed, in which the method comprises the steps of: detecting rear-view images of an ego-vehicle so as to be used for defining three regions of interest (ROI) corresponding respectively to a lane to the left of the ego-vehicle, a lane to the right of the ego-vehicle, and a lane where the ego-vehicle is travelling thereon; detecting whether there is any direction light that is flashing to be used as basis for determining whether there is any vehicle approaching from the rear that is expected to be a potential threat to the ego-vehicle; and if so, issuing an alarm signal to the driver of the ego-vehicle for reminding the same to aware the distance between the ego-vehicle and the rear-approaching vehicle. Thereby, the driver's road environment awareness is enhanced and consequently the safety of driving can be improved.

19 Claims, 5 Drawing Sheets

(56) References Cited

U.S. PATENT DOCUMENTS

| | | | |
|---|---|---|---|
| 6,292,111 B1* | 9/2001 | Ishikawa et al. | 340/937 |
| 6,360,170 B1 | 3/2002 | Ishikawa et al. | |
| 7,876,926 B2* | 1/2011 | Schwartz et al. | 382/104 |
| 8,615,357 B2* | 12/2013 | Simon | 701/301 |
| 2004/0148057 A1* | 7/2004 | Breed et al. | 700/242 |
| 2005/0278098 A1* | 12/2005 | Breed | 701/45 |
| 2008/0238718 A1 | 10/2008 | Jung | |
| 2009/0063053 A1* | 3/2009 | Basson et al. | 702/1 |
| 2009/0102629 A1* | 4/2009 | Kaller et al. | 340/435 |
| 2009/0265061 A1 | 10/2009 | Watanabe et al. | |
| 2010/0073152 A1* | 3/2010 | Nagamine et al. | 340/425.5 |
| 2011/0010094 A1 | 1/2011 | Simon | |
| 2011/0029195 A1* | 2/2011 | Yamada et al. | 701/36 |
| 2012/0099766 A1* | 4/2012 | Klein et al. | 382/104 |
| 2012/0154591 A1* | 6/2012 | Baur et al. | 348/148 |

FOREIGN PATENT DOCUMENTS

| | | | |
|---|---|---|---|
| JP | 7050769 A | 2/1995 | |
| TW | I270827 B | 1/2007 | |
| TW | I298298 B | 7/2008 | |
| TW | I301812 B | 10/2008 | |
| TW | 201022065 A | 6/2010 | |
| WO | WO-2007/070159 A2 | 6/2007 | |

OTHER PUBLICATIONS

Wang et al., "Overtaking Vehice Detection Using Dyanmic and Quasi-Static Background Modeling", IEEE Computer Society Conference on Computer Vision and Pattern Recognition, pp. 1-8, Jun. 2005.

Wang et al., "Conflict-Probability-Probability—Estimation-Based Overtaking for Intelligent Vehicles", IEEE Transactions on Intelligent Transportation Systems, vol. 10, No. 2, Jun. 2009.

Batavia et al., "Overtaking Vehice Detection Using Implicit Optical Flow", Proceedings of the IEEE Transportation Systems Conference, pp. 729-734, 1997.

Techmer, "Real-time Motion Analysis for Monitoring the Rear and Lateral Road", 2004 IEEE Intelligent Vehicles Symposium, pp. 704-709, Jun. 14-17, 2004.

O'Malley et al., "Vision-based detection and tracking of vehicles to the rear with perspective correction in low-light conditions", IET Intelligent Transport Systems, vol. 5, Iss. 1, pp. 1-10, 2011.

Alonso et al., "Lane-Change Decision Aid System Based on Motion-Driven Vehicle Tracking", IEEE Transactions on Vehicular Technology, vol. 57, No. 5, Sep. 2008.

* cited by examiner

WARNING METHOD AND SYSTEM FOR DETECTING LANE-CHANGING CONDITION OF REAR-APPROACHING VEHICLES

TECHNICAL FIELD

The present disclosure relates to a warning method and system for detecting lane-changing condition of rear-approaching vehicles, and more particularly, to a method and system capable of detecting the driving conditions of vehicles coming from the rear so as to be used as a base for issuing an alert to a driver driving the ego-vehicle that has the warning system mounted thereon or is performing the warning method, and thus, reminding the driver to aware the distances of the ego-vehicle and the rear-approaching vehicles. Thereby, the driver's road environment awareness is enhanced.

TECHNICAL BACKGROUND

With rapid advance in technology and economy, almost every family is able to afford a motor vehicle, and thus there are more and more motor vehicles on the road. Consequently, with more and more cars being purchased each year and engines becoming even more efficient and technically specialized, driving safety is becoming an issue to be concerned.

Although the modern motor vehicles are more comfort, more technically advanced and more user friendly, there is still plenty to be improved regarding to the development in means for improving driving safety, especially for detecting and alerting vehicles approaching from the rear.

There are already many studies focused on the development in means for improving driving safety. One of which is a rear-view monitor disclosed in U.S. Pat. No. 6,218,960, which is designed for warning a driver of a host vehicle on which the rear-view monitor is mounted to respond to an vehicle approaching from the rear in the same lane or the adjacent lane according to an analysis based upon images of road in the rear of the host vehicle with regard to whether the rear-approaching vehicle is going to overtake the host vehicle, or the rear vehicle is approaching dangerously close to the rear of the host vehicle. Another such study is disclosed in JP Patent No. 2287799, which provides a method capable of detecting and determining whether there is any vehicle travelling in the adjacent lane that is approaching dangerously close to the host vehicle performing the method, and thus issuing an alert signal to a driver of the host vehicle as soon as the driver is changing lane into the path of the approaching vehicle so as to remind the driver that this lane-changing operation is dangerous for causing collision. Moreover, there is further another study disclosed in JP Pat. No. 7050769, which provides a method capable of using an optical flow analysis to determine whether the vehicle approaching from the rear or travelling in the adjacent lane is approaching dangerously close to the host vehicle performing the method while issuing a alert signal to the driver of the host vehicle when the host vehicle is in danger of colliding with the approaching vehicle.

Using the means provided in the aforesaid U.S. and Japanese patents, although any vehicle approaching or overtaking the host vehicle from the adjacent lane or an approaching vehicle in the adjacent lane that is travelling dangerously close to the host vehicle will be detected, and thereby triggers an alarm to be activated for warning the driver of the host vehicle, there are still plenty of other hazardous driving conditions that are remained unaccounted for. For instance, there can be a vehicle that is travelling on the same lane behind the host vehicle and abruptly performs a lane changing maneuver into one adjacent lane after it had approached dangerously close to the host vehicle, or there can be a vehicle that is approaching the host vehicle from the rear in one adjacent lane and abruptly performs a lane changing maneuver into the same lane of the host vehicle after it had approached dangerously close to the host vehicle; and nevertheless, in both case, the driver of the host vehicle should avoid performing any lane changing maneuver at the same time when the approaching vehicle is changing lane, and thus it is important for the driver of the host vehicle to aware at all time the relative distance between the host vehicle and the approaching vehicle. However, there is no study ever that is able to warn the driver for the aforesaid two hazardous driving conditions.

Therefore, it is in need of a warning method and system for detecting lane-changing condition of rear-approaching vehicles.

TECHNICAL SUMMARY

The present disclosure relates to a warning method and system for detecting lane-changing condition of rear-approaching vehicles, capable of using an image sensor to detect rear-view images of an ego-vehicle that has the warning system mounted thereon or is performing the warning method so as to define three regions of interest (ROI) corresponding respectively to a lane to the left of the ego-vehicle, a lane to the right of the ego-vehicle, and a lane where the ego-vehicle is travelling thereon, and then determine whether there is any direction light that is flashing in the three ROIs so as to determine whether there is any vehicle approaching from the rear that is expected to be a potential threat to the ego-vehicle, and if so, issuing an alarm signal to the driver of the ego-vehicle for reminding the same to aware the relative distance between the ego-vehicle and the rear-approaching vehicle.

In an exemplary embodiment, the present disclosure provides a warning method for detecting lane-changing condition of rear-approaching vehicles, comprising the steps of:

performing an image acquisition process for sensing a rear-view image of an ego-vehicle that is performing the warning method;

performing a lane line recognition algorithm for identifying lane lines in the rear-view image and thus obtaining the position information of the lane lines in an image coordinate system;

defining three regions of interest (ROI) corresponding respectively to a lane to the left of the ego-vehicle, a lane to the right of the ego-vehicle, and a lane where the ego-vehicle is travelling thereon, i.e., a left lane ROI, a right lane ROI and an ego-lane ROI, while enabling the three ROIs to be defined based upon the expected height of any common direction light, so as to allow any direction light on a rear-approaching vehicle that is flashing to be recognizable on the acquired rear-view image and thus to be used for determining accurately whether the rear-approaching vehicle is traveling on the same lane of the ego-vehicle or is traveling on the adjacent lane to the ego-vehicle;

determining whether there is any direction light flashing in the left lane ROI, indicating that there is a vehicle approaching the ego-vehicle from the rear in the lane to the left of the ego-vehicle, and then determining whether the flashing direction light on the rear-approaching vehicle is the one used for right-turn indication, and if so, performing a warning process for issuing an alarm signal to the driver of the ego-vehicle for reminding the same that the rear-approaching vehicle is going to perform a lane changing maneuver to move from the left lane to the same lane of the ego-vehicle;

determining whether there is any direction light flashing in the right lane ROI, indicating that there is a vehicle approaching the ego-vehicle from the rear in the lane to the right of the ego-vehicle, and then determining whether the flashing direction light on the rear-approaching vehicle is the one used for left-turn indication, and if so, performing the warning process for issuing an alarm signal to the driver of the ego-vehicle for reminding the same that the rear-approaching vehicle is going to perform a lane changing maneuver to move from the right lane to the same lane of the ego-vehicle; and determining whether there is any direction light flashing in the ego-lane ROI, indicating that there is a vehicle approaching the ego-vehicle from the rear in the same lane of the ego-vehicle, and then determining whether the flashing direction light on the rear-approaching vehicle is the one used for right-turn indication, and if so, performing the warning process for issuing an alarm signal to the driver of the ego-vehicle for reminding the same that the rear-approaching vehicle is going to perform a lane changing maneuver to move from the ego-lane to the lane to the right of the ego-vehicle; otherwise, determining whether the flashing direction light on the rear-approaching vehicle is the one used for left-turn indication, and if so, performing the warning process for issuing an alarm signal to the driver of the ego-vehicle for reminding the same that the rear-approaching vehicle is going to perform a lane changing maneuver to move from the ego-lane to the lane to the left of the ego-vehicle.

In another exemplary embodiment, the present disclosure provides a warning system for detecting lane-changing condition of rear-approaching vehicles, comprising:

a signal process-control module;

an image sensor, electrically connected to the signal processing/control module;

a control unit, electrically connected to the signal processing/control module;

a display unit, electrically connected to the signal processing/control module; and an alarm unit, electrically connected to the signal processing/control module.

Comparing with prior arts, the warning method and system for detecting lane-changing condition of rear-approaching vehicles of the present disclosure have the following advantages:

1. As the thee ROIs, i.e., the left lane ROI, the right lane ROI and the ego-lane ROI, are defined using the techniques of lane line detection, inverse perspective projection and perspective projection with reference to the expected height of any common direction light, the present disclosure is able to perform a direction light detection algorithm for determining whether or not there is a vehicle approaching from the rear that is going to perform a lane changing maneuver.

2. According to the present disclosure, as soon as the ego-vehicle is shifted into a forward gear and starts moving, the warning system mounted on the ego-vehicle will be activated simultaneously for detecting lane-changing condition of rear-approaching vehicles. Consequently, as soon as the warning system detects either a rear-approaching vehicle in the left activates its right-turn direction light or a rear-approaching vehicle in the right activates its left-turn direction light, the warning system will determine that the rear-approaching vehicle is going to enter the same lane of the ego-vehicle and thus it will issue an alarm signal for informing the driver of the ego-vehicle about this driving condition. Thus, after being acknowledged by the alarm signal, the driver is able to monitor the rear-approaching vehicle through a monitor device, such as rear-view mirror or a visual sensor, so as to be aware of the relative position between the ego-vehicle and the rear-approaching vehicle for preventing any danger of collision.

3. In another condition when the rear-approaching vehicle which had either its right-turn direction light or left-turn direction light activated is travelling in the same lane of the ego-vehicle, indicating that the rear-approaching vehicle is going to move left or right into the corresponding adjacent lane, and if the same time that the driver of the ego-vehicle is not aware of the situation and also performs a lane-changing maneuver into the adjacent lane, the chance of collision can be very high. Thus, the warning system of the present disclosure is designed to issue an alarm signal to the driver as soon as any direction light of the rear-approaching vehicle that is travelling in the same lane of the ego-vehicle had been turned on for warning the driver that the vehicle approaching from the rear is going to move into the adjacent lane. Thus, after being acknowledged by the alarm signal, the driver is able to monitor the rear-approaching vehicle through a monitor device, so as to be aware of the relative position between the ego-vehicle and the rear-approaching vehicle for preventing any danger of collision.

4. By the warning method and system of the present disclosure, before any lane-changing maneuver being performed by the rear-approaching vehicle travelling either in the adjacent lane or in the same lane of the ego-vehicle, the driver of the ego-vehicle will be warned by an alarm signal to aware of the situation.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DESCRIPTION OF THE EXEMPLARY EMBODIMENTS

For your esteemed members of reviewing committee to further understand and recognize the fulfilled functions and structural characteristics of the disclosure, several exemplary embodiments cooperating with detailed description are presented as the follows.

Figure 1:
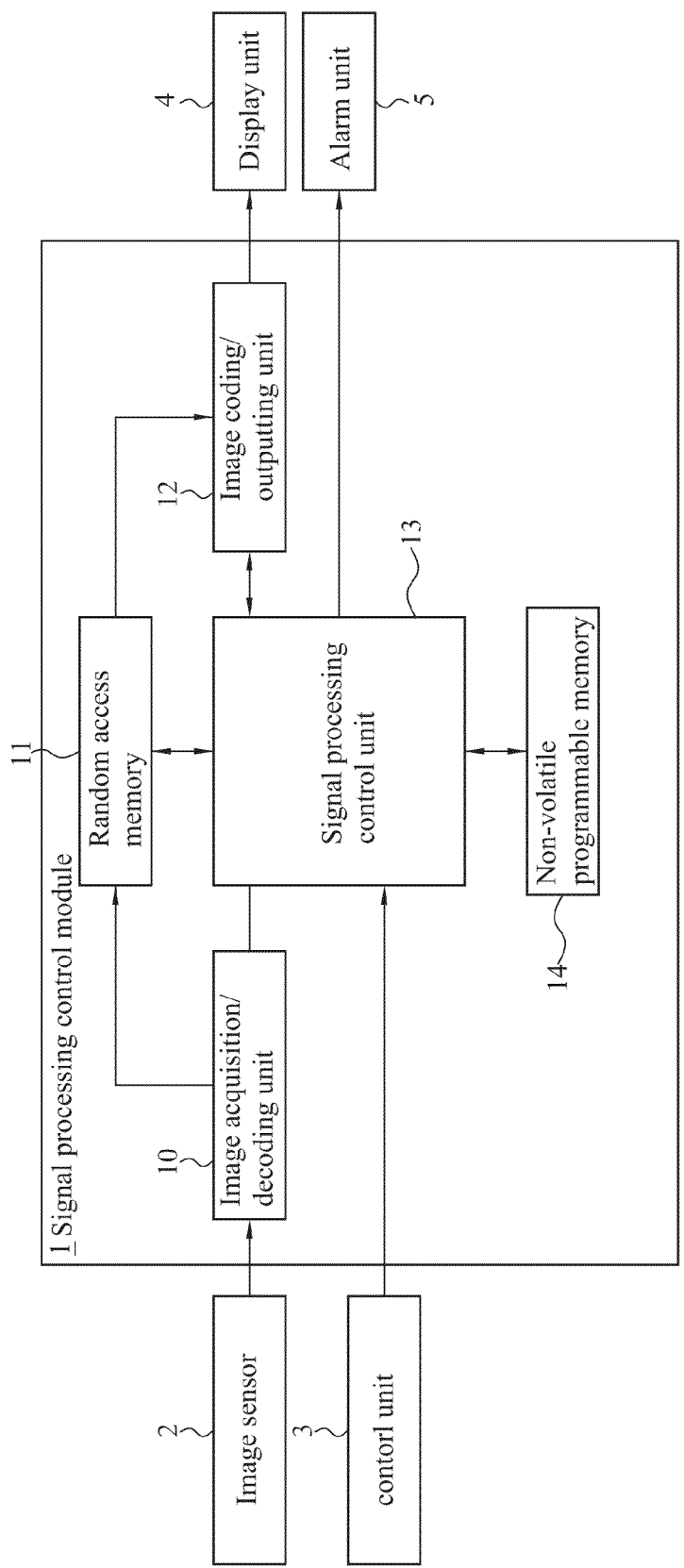
FIG. 1 is a schematic diagram showing a warning system for detecting lane-changing condition of rear-approaching vehicles according to an exemplary embodiment of the present disclosure.

Please refer to FIG. 1, which is a schematic diagram showing a warning system for detecting lane-changing condition of rear-approaching vehicles according to an exemplary embodiment of the present disclosure. As shown in FIG. 1, the warning system comprises: a signal processing/control module 1, an image sensor 2, a control unit 3, a display unit 4 and an alarm unit 5.

The signal processing/control module 1 further comprises: an image acquisition/decoding unit 10, a random access memory (RAM) 11, an image coding/outputting unit 12, a signal processing/control unit 13 and a non-volatile programmable memory 14.

The image sensor 2, being a device selected from the group consisting of: an infrared image capturing device, a charge coupled device (CCD) and a complementary metal oxide semiconductor (CMOS), is electrically connected to the image acquisition/decoding unit 10 through a transmission interface, whereas the transmission interface can be an analog interface or a digital interface, such as an analog composite video interface or a digital low-voltage differential signal (LVDS) interface.

Figure 3A:
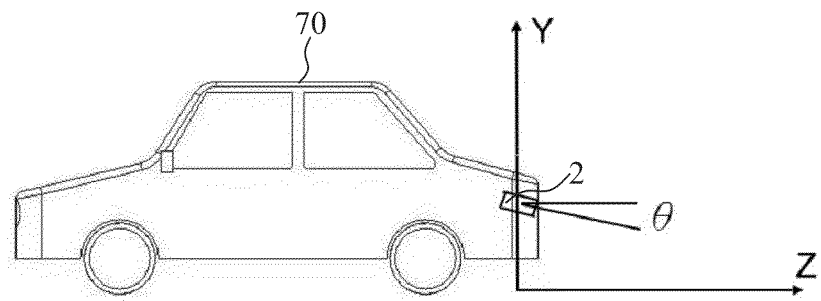
FIG. 3A is a side view of an image sensor being mounted on the rear of a vehicle that is performing the warning method of the present disclosure.

Moreover, the control unit 3, the display unit 4, and the alarm unit 5 are all electrically connected to the signal processing/control module 1 in respective. In an exemplary embodiment, the image sensor 2 is mounted on the rear of a vehicle at a specific position for capturing rear-view images of the vehicle, as shown in FIG. 3A.

The control unit 3 is designed to be controlled by users for activating the image sensor 2, the signal processing/control module 1. the display unit 4 and the alarm unit 5; the image acquisition/decoding unit 10 is used for processing and converting the images captured by the image sensor 2 digital signal capable of being processed by the signal processing/control unit 13; the random access memory 11 is used for storing digital data transmitted from the signal processing/control unit 13; the image coding/outputting unit 12 is used for receiving and coding data from the random access memory 11 into image data while outputting the same to the display unit 4 for displaying; and the non-volatile programmable memory 14 is used for storing the image data, a data for configuration, and a data for updating; the display unit 4 is used for displaying image information including lane lines and vehicles approaching from the rear.

Operationally, the image stored in the random access memory 11 is retrieved by the signal processing/control unit 13 where it is processed and evaluated for determining whether the information containing in the image match with a scenario that is predefined to be dangerous; and if so, the signal processing/control module 1 will be activated to issue a signal to the alarm unit 5 for enabling the same to generated an alarm for warning the driver. It is noted that the alarm signal generated by the alarm unit 5 can be a signal of sounds, a signal of lights, a vibration signal or the combinations thereof.

In addition, the signal processing/control module 1, being a device having a Sobel filter configured therein and equipped with the abilities of Hough transform operation and logical decision operation, can further be used for defining three regions of interest (ROI) corresponding respectively to a lane to the left of an ego-vehicle, a lane to the right of the ego-vehicle, and a lane where the ego-vehicle is travelling thereon, i.e., a left lane ROI, a right lane ROI and an ego-lane ROI. The detail about the algorithm and equation used in the signal processing/control module 1 for obtaining the three ROIs will be provided hereinafter.

Figure 2A:
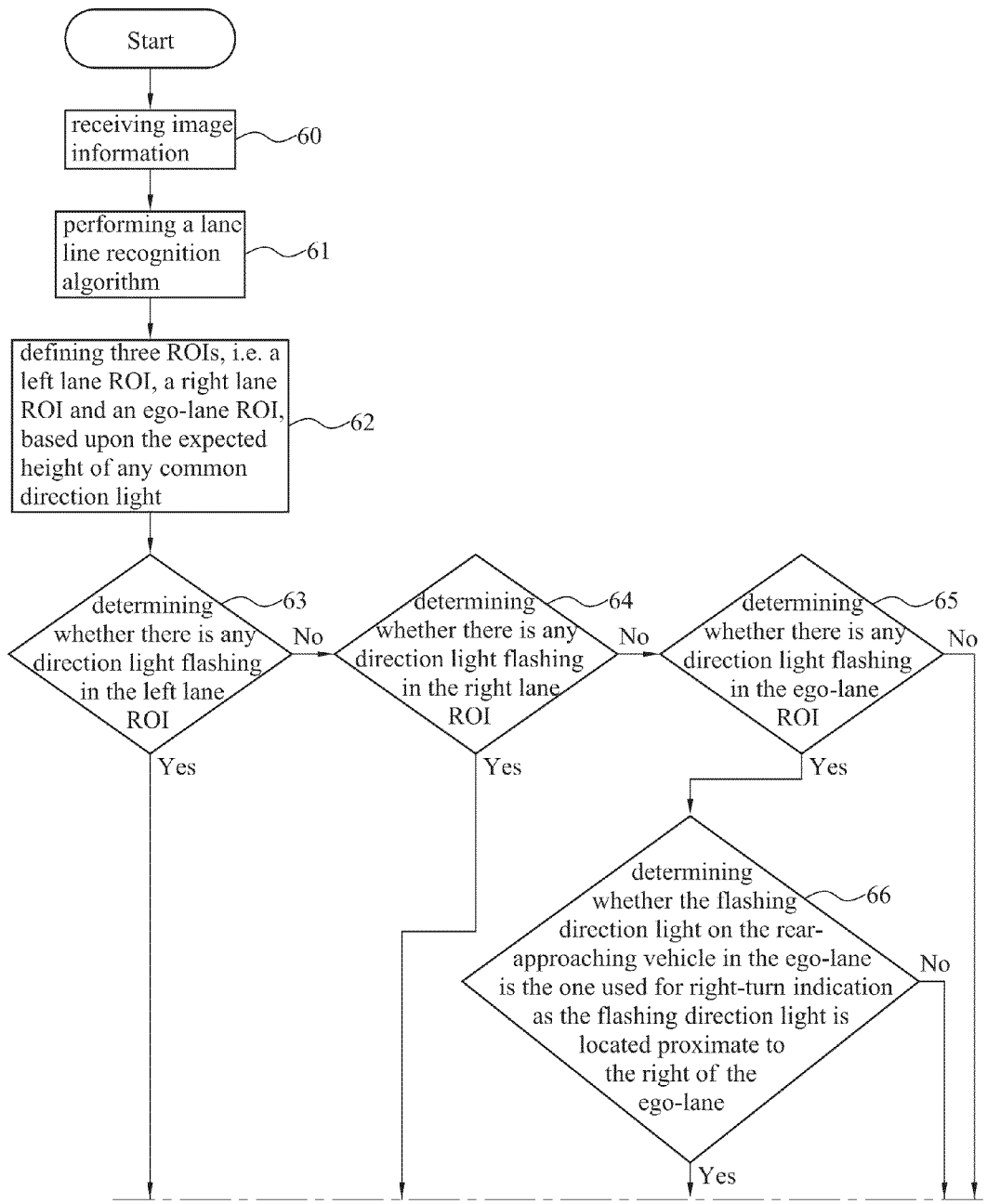
FIG. 2A and its continuation FIG. 2B represent a flow chart depicting the steps performed in a warning method for detecting lane-changing condition of rear-approaching vehicles according to an exemplary embodiment of the present disclosure.
Figure 2B:
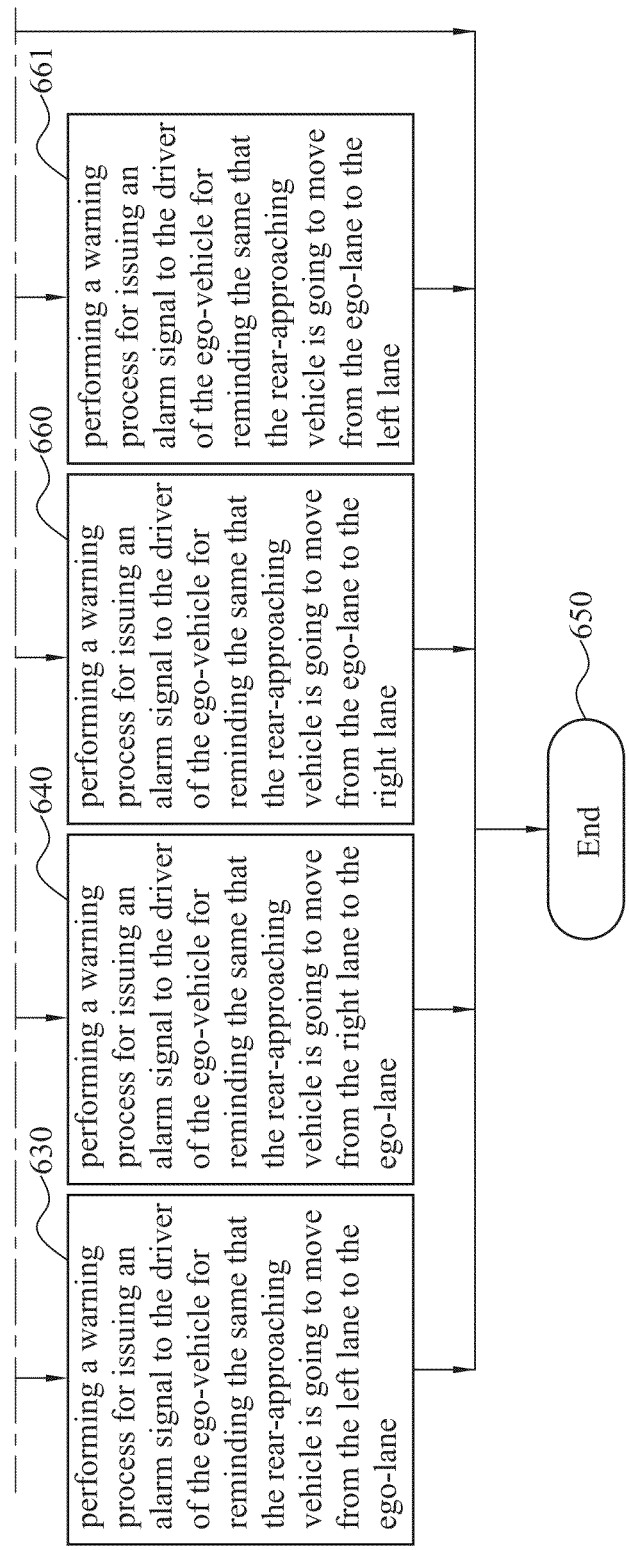
Figure 3B:
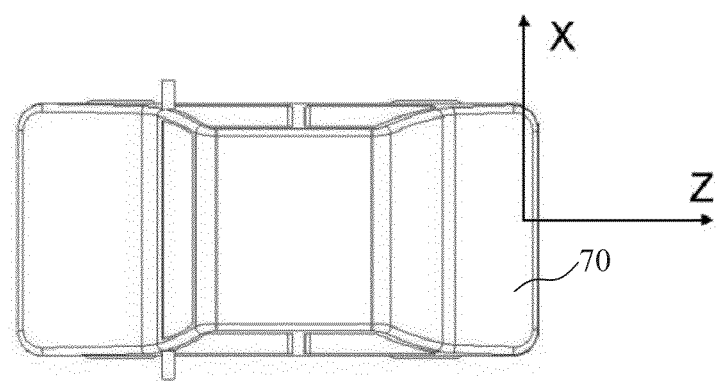
FIG. 3B is a top view of FIG. 3A.
Figure 3C:
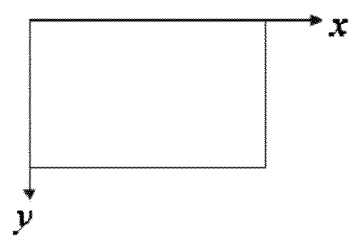
FIG. 3C is a schematic diagram showing an image coordinate system used in the present disclosure.

Please refer to FIG. 2A and its continuation FIG. 2B, which is a flow chart depicting the steps performed in a warning method for detecting lane-changing condition of rear-approaching vehicles according to an exemplary embodiment of the present disclosure. The flow starts at step 60. At step 60, an image acquisition process is performed for sensing a rear-view image of an ego-vehicle that is performing the warning method; and then the flow proceeds to step 61. As shown in FIG. 3A to FIG. 3C, the image acquisition process is executed using at least one image sensor 2 that is mounted on the rear of the ego-vehicle 70 at a specific position; and the at least one image sensor 2 is designed to be activated along with the activation of a signal processing/control module 1, a display unit 4 and an alarm unit 5 the minute when the ego-vehicle 70 is shifted into a forward gear and starts moving. Operationally, as soon as the image sensor 2 is activated, it will start capturing rear images of the ego-vehicle 70. It is noted that the position of the image sensor 2 on the ego-vehicle 70 is defined based upon a vehicle coordinate system, while the image captured by the image sensor 2 is defined based upon an image coordinate system of the image sensor 2, as shown in FIG. 3C. Operationally, the images captured by the image sensor 2 will be transmitted to the signal processing/control module 1.

As shown in FIG. 3A and FIG. 3B, the vehicle coordinate system is a coordiante system which is usded to uniquely determine the position of a point or other geometric elements in a 3D space including the position of the ego-vehicle 70 and those other positions in the rear of the ego-vehicle 70. As shown in FIG. 3C, the image coordinate system is a coordiante system which is used to uniquely determine the position of a point or other geometric elements of the rear-view image that is 2D and acquired by the image sensor 2 and displayed on the displaying area of a display unit 4.

Figure 4:
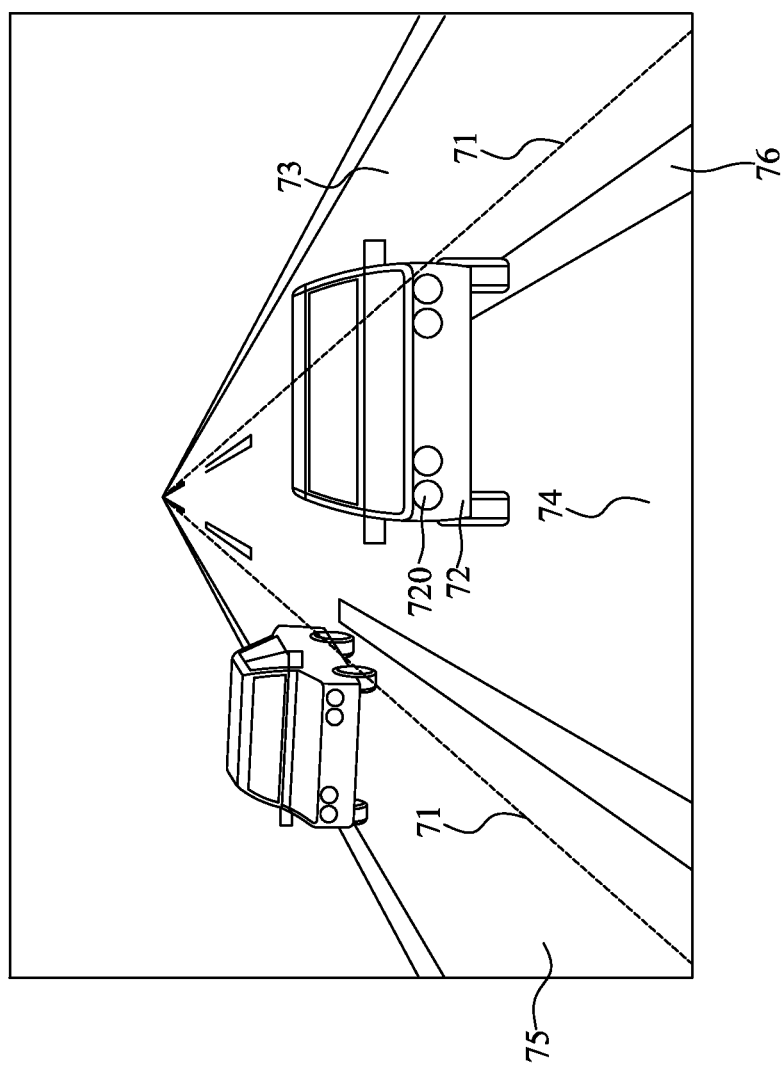
FIG. 4 is a schematic diagram showing a rear-view image captured using an image senor mounted on an ego-vehicle that is performing the warning method of the present disclosure.

At step 61, a lane line recognition algorithm is executed; and then the flow proceeds to step 62. As shown in FIG. 4, in the performing of the lane line recognition algorithm, the signal processing/control module 1 is used for processing the rear-view image using a Sobel filter so as to identify edges of lane lines that are to be used in a Hough transform operation for obtaining position information of the lane lines 76 in the image coordinate system.

At step 62, three ROIs, i.e., a left lane ROI, a right lane ROI and an ego-lane ROI, are defined based upon the expected height of any common direction light; and then the flow proceeds to step 63. In detail, the defining of the three ROIs is performed in a means comprising the steps of: using a technique of inverse perspective projection with reference to the expected height of any common direction light for obtaining expected positions of direction lights on the vehicle approaching from the right lane 75 in the vehicle coordinate system, expected positions of direction lights on a vehicle approaching from the left lane 73 in the vehicle coordinate system, and expected positions of direction lights on a vehicle approaching from the ego-lane 74 in the vehicle coordinate system; and then using a technique of perspective projection with reference to the positions of the identified lane lines and the expected height of any common direction light to determine the adaptive lane lines 71 which is defined in the image coordinate system for obtaining the left lane ROI, the right lane ROI and the ego-lane ROI. It is noted that since the defining of the three ROIs takes the expected height of direction lights into account, the lines separating the three ROIs are not actual lane lines 76 detected in the rear-view image, but are adaptive lane lines 71. After the three ROIs are defined according to the adaptive lane lines 71, the warning method will proceed to perform operations for determining whether there are direction lights 720 that are flashing in any of the three ROIs, and so as to determine whether there is a rear-approaching vehicle 72 that is going to move from the ROI of left lane 73 or the ROI of the right lane 75 into the ROI of the ego-lane 74, or whether there is a rear-approaching vehicle 72 that is going to move from the ROI of the ego-lane 74 into either the ROI of left lane 73 or the ROI of the right lane 75.

Referring to FIG. 3A to FIG. 3B, the following description relates to the algorithm for defining the three ROIs. With reference to the positions $(x_i, y_i)$ of the lane lines 76 detected in the image coordinate system, the positions $(x_v, z_v)$ of the lane line in the vehicle coordinate system can be obtained using the following equations:

$$x_v = \frac{\left(x_i - \frac{x_{size}}{2}\right)(z_v \cos\theta + H \sin\theta)}{k_x}; \text{ and}$$

$$z_v = \frac{H\left(k_y \cos\theta - \left(y_i - \frac{y_{size}}{2}\right)\sin\theta\right)}{\left(k_y \sin\theta - \left(y_i - \frac{y_{size}}{2}\right)\cos\theta\right)};$$

wherein,
H is the height of the image sensor;
$x_{size}$ is the width of the rear-view image;
$y_{size}$ is the height of the rear-view image;
$k_x$ is a scale factor in x-axis direction;
$k_y$ is a scale factor in y-axis direction; and
θ is the tilt angle between the orientation of the image sensor and the ground level, as shown in FIG. 3A.

Moreover, since most front direction lights are mounted on a common vehicle at a height of 0.8 m above ground. That is, $y_v$=0.8. Consequently, by feeding the $(x_v, z_v)$ of the lane lines in the vehicle coordinate system and the expected height $y_v$ of any common direction light into the following equations:

$$x_L = \frac{x_{size}}{2} + \frac{x_v k_x}{-y_v \sin\theta + z_v \cos\theta + H \sin\theta}; \text{ and}$$

$$y_L = \frac{y_{size}}{x} + k_y \frac{y_v \cos\theta + z_v \sin\theta - H \cos\theta}{-y_v \sin\theta + z_v \cos\theta + H \sin\theta};$$

the positions $(x_L, y_L)$ of the edges of the adaptive lane lines 71 which is the dotted line shown in FIG. 4, in the image coordinate system can be obtained and used as the separation lines for defining the left lane ROI, the right lane ROI and the ego-lane ROI.

At step 63, an operation is performed for determining whether there is any direction light flashing in the left lane ROI; if so, the flow proceeds to step 630, otherwise the flow proceeds to step 64. In detail, during the performing of step 63, an evaluation is made for determining whether there is any direction light flashing in the left lane ROI, indicating that there is a vehicle 72 approaching the ego-vehicle 70 from the left the lane 73 to the same lane 74 of the ego-vehicle 70, and then determining whether the flashing direction light on the rear-approaching vehicle 72 is the one used for right-turn indication 720, and if so, the step 630 will be executed for enabling the alarm unit 5 to issue an alarm signal to the driver of the ego-vehicle 70 for reminding the same that the rear-approaching vehicle 72 is going to perform a lane changing maneuver to move from the left lane 73 to the same lane 74 of the ego-vehicle 70. Normally, since most vehicles are equipped with certain monitoring devices, such as the rear-view mirror, the driver of the ego-vehicle 70 can be reminded by the alarm unit 5 to monitor the dynamic of the rear-approaching vehicle 72 using the rear-view mirror as soon as the right-turn direction light of the rear-approaching vehicle 72 is flashing and detected.

At step 64, an operation is performed for determining whether there is any direction light flashing in the right lane ROI; if so, the flow proceeds to step 640, otherwise the flow proceeds to step 65. In detail, during the performing of step 64, an evaluation is made for determining whether there is any direction light flashing in the left lane ROI, indicating that there is a vehicle 72 approaching the ego-vehicle 70 from the right lane 75 to the same lane 74 of the ego-vehicle 70, and then determining whether the flashing direction light on the rear-approaching vehicle 72 is the one used for left-turn indication 720, and if so, the step 640 will be executed for enabling the alarm unit 5 to issue an alarm signal to the driver of the ego-vehicle 70 for reminding the same that the rear-approaching vehicle 72 is going to perform a lane changing maneuver to move from the right lane 75 to the same lane 74 of the ego-vehicle 70.

At step 65, an operation is performed for determining whether there is any direction light flashing in the ego-lane ROI; if so, the flow proceeds to step 66, otherwise, the flow proceeds to step 65 for ending the process. In detail, during the performing of step 65, an evaluation is made for determining whether there is any direction light 720 flashing in the ego-lane ROI, indicating that there is a vehicle 72 approaching the ego-vehicle 70 from the rear in the same lane 74 of the ego-vehicle 70, and if so, the step 66 will be executed for determining whether the flashing direction light 720 on the rear-approaching vehicle is the one used for right-turn indication, i.e., whether the flashing direction light 720 is located to the right of the ego-lane 74, and if so, the step 660 will be executed for enabling the alarm unit 5 to issue an alarm signal to the driver of the ego-vehicle 70 for reminding the same that the rear-approaching vehicle 72 is going to perform a lane changing maneuver to move from the ego-lane 74 to the right lane 75 of the ego-vehicle 70; otherwise, the step 661 will be executed for enabling the alarm unit 5 to issue an alarm signal to the driver of the ego-vehicle 70 for reminding the same that the rear-approaching vehicle is going to perform a lane changing maneuver to move from the ego-lane 74 to the left lane 73 of the ego-vehicle 70.

After each completion of the aforesaid warning method, there can be five possible outcomes, which are first, there can be no direction light that is flashing in the acquired image, indicating that there is no direction light flashing in the three ROIs; second, an alarm is issued for warning the driver that the rear-approaching vehicle is going to move from the left lane to the ego-lane, as depicted in step 630; third, an alarm is issued for warning the driver that the rear-approaching vehicle is going to move from the right lane to the ego-lane, as depicted in step 640; fourth, an alarm is issued for warning the driver that the rear-approaching vehicle is going to move from the ego-lane to the right lane, as depicted in step 660; and fifth, an alarm is issued for warning the driver that the rear-approaching vehicle is going to move from the ego-lane to the left lane, as depicted in step 661. After any of the steps 630, 640, 660, 661, the flow will proceed to step 650 for ending the process while returning back to step 60 for acquiring new rear-view image to start a new process.

To sum up, the present disclosure provides a warning method and system for detecting lane-changing condition of rear-approaching vehicles, in which the method comprises the steps of: detecting rear-view images of an ego-vehicle so as to be used for defining three regions of interest (ROI) corresponding respectively to a lane to the left of the ego-vehicle, a lane to the right of the ego-vehicle, and a lane where the ego-vehicle is travelling thereon; detecting whether there is any direction light that is flashing to be used as basis for determining whether there is any vehicle approaching from the rear that is expected to be a potential threat to the ego-vehicle; and if so, issuing an alarm signal to the driver of the ego-vehicle for reminding the same to aware the distance between the ego-vehicle and the rear-approaching vehicle. Thereby, the driver's road environment awareness is enhanced and consequently the safety of driving can be improved.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A warning method for detecting lane-changing condition of rear-approaching vehicles, comprising:

performing an image acquisition process for sensing a rear-view image of an ego-vehicle that is performing the warning method;

performing a lane line recognition algorithm for identifying lane lines in the rear-view image and thus obtaining the position information of the lane lines in an image coordinate system;

defining three regions of interest (ROI) corresponding respectively to a lane to the left of the ego-vehicle, a lane to the right of the ego-vehicle, and a lane where the ego-vehicle is travelling thereon, i.e., a left lane ROI, a right lane ROI and an ego-lane ROI, while enabling the three ROIs to be defined based upon the expected height of any common direction light, so as to allow any direction light on a rear-approaching vehicle that is flashing to be recognizable on the acquired rear-view image and thus to be used for determining accurately whether the rear-approaching vehicle is traveling on the same lane of the ego-vehicle or is traveling on the adjacent lane, to the ego-vehicle i.e., the left lane or the right lane;

determining whether there is any direction light flashing in the left lane ROI, indicating that there is a vehicle approaching the ego-vehicle from the left lane of the ego-vehicle, and then determining whether the flashing direction light on the rear-approaching vehicle is the one used for right-turn indication, and if so, performing a warning process for issuing an alarm signal to the driver of the ego-vehicle for reminding the same that the rear-approaching vehicle is going to perform a lane changing maneuver to move from the left lane to the same lane of the ego-vehicle;

determining whether there is any direction light flashing in the right lane ROI, indicating that there is a vehicle approaching the ego-vehicle from the right lane of the ego-vehicle, and then determining whether the flashing direction light on the rear-approaching vehicle is the one used for left-turn indication, and if so, performing the warning process for issuing an alarm signal to the driver of the ego-vehicle for reminding the same that the rear-approaching vehicle is going to perform a lane changing maneuver to move from the right lane to the same lane of the ego-vehicle; and determining whether there is any direction light flashing in the ego-lane ROI, indicating that there is a vehicle approaching the ego-vehicle from the rear in the same lane of the ego-vehicle, and then determining whether the flashing direction light on the rear-approaching vehicle is the one used for right-turn indication, and if so, performing the warning process for issuing an alarm signal to the driver of the ego-vehicle for reminding the same that the rear-approaching vehicle is going to perform a lane changing maneuver to move from the ego-lane to the right lane of the ego-vehicle; otherwise, determining whether the flashing direction light on the rear-approaching vehicle is the one used for left-turn indication, and if so, performing the warning process for issuing an alarm signal to the driver of the ego-vehicle for reminding the same that the rear-approaching vehicle is going to perform a lane changing maneuver to move from the ego-lane to the left lane of the ego-vehicle.

2. The warning method of claim 1, wherein the image acquisition process is executed using at least one image sensor that is mounted on the rear of the ego-vehicle at a specific position; and then at least one image sensor is designed to be activated along with the activation of a signal processing and control module, a display unit and an alarm unit the minute when the ego-vehicle is shifted into a forward gear and starts moving.

3. The warning method of claim 1, wherein during the performing of the image acquisition process, the rear-view image of the ego-vehicle is acquired using an image sensor and then the image sensor is enabled to transmit the acquired rear-view image to a signal processing and control module.

4. The warning method of claim 1, wherein in the performing of the lane line recognition algorithm, a signal processing and control module is used for processing the rear-view image using a Sobel filter so as to identify edges of lane lines that are to be used in a Hough transform operation for obtaining position information of the lane lines in the image coordinate system.

5. The warning method of claim 4, wherein the image coordinate system is a coordinate system which is used to uniquely determine the position of a point or other geometric elements of the rear-view image that is acquired by the image sensor and displayed on the displaying area of a display unit.

6. The warning method of claim 1, wherein the defining of the three ROIs is performed in a means comprising:

using a technique of inverse perspective projection with reference to the expected height of any common direction light for obtaining expected positions of direction lights on a vehicle approaching from the right lane in a vehicle coordinate system, expected positions of direction lights on a vehicle approaching from the left lane in the vehicle coordinate system, and expected positions of direction lights on a vehicle approaching from the ego-lane in the vehicle coordinate system; and then using a technique of perspective projection with reference to the positions of the identified lane lines and the expected height of any common direction light to determine the adaptive lane lines which is defined in the image coordinate system for obtaining the left lane ROI, the right lane ROI and the ego-lane ROI.

7. The warning method of claim 6, wherein the vehicle coordinate system is a coordinate system which is used to uniquely determine the position of a point or other geometric elements in a space including the position of the ego-vehicle and those other positions in the rear of the ego-vehicle.

8. The warning method of claim 6, wherein in the defining of the three ROIs, the lines separating the three ROIs are not actual lane lines detected in the rear-view image, but are adaptive lane lines.

9. The warning method of claim 6, wherein the defining of the three ROIs is performed in a means comprising:
with reference to the positions $(x_i, y_i)$ of the lane lines detected in the image coordinate system, using the following inverse perspective projection equations:

$$x_v = \frac{\left(x_i - \frac{x_{size}}{2}\right)(z_v\cos\theta + H\sin\theta)}{k_x}; \text{ and}$$

$$z_v = \frac{H\left(k_y\cos\theta - \left(y_i - \frac{y_{size}}{2}\right)\sin\theta\right)}{\left(k_y\sin\theta - \left(y_i - \frac{y_{size}}{2}\right)\cos\theta\right)};$$

whereas, H is the height of the image sensor;
$x_{size}$ is the width of the rear-view image;
$y_{size}$ is the height of the rear-view image;
$k_x$ is a scale factor in x-axis direction;
$k_y$ is a scale factor in y-axis direction; and
$\theta$ is the tilt angle between the orientation of the image sensor and the ground level;
for obtaining positions $(x_v, z_v)$ of the lane lines in the vehicle coordinate system; and
feeding the $(x_v, z_v)$ of the lane lines in the vehicle coordinate system and the expected height $y_v$ of any common direction light into the following perspective projection equations:

$$x_L = \frac{x_{size}}{2} + \frac{x_v k_x}{-y_v\sin\theta + z_v\cos\theta + H\sin\theta}; \text{ and}$$

$$y_L = \frac{y_{size}}{x} + k_y \frac{y_v\cos\theta + z_v\sin\theta - H\cos\theta}{-y_v\sin\theta + z_v\cos\theta + H\sin\theta};$$

for obtaining the positions $(x_L, y_L)$ of the edges of the adaptive lane lines, in the image coordinate system so as to be used for obtaining the left lane ROI, the right lane ROI and the ego-lane ROI.

10. The warning method of claim 4, wherein during the performing of the lane line recognition algorithm, a signal processing and control module is used for processing the rear-view image so as to obtain the position information of the lane lines in the image coordinate system.

11. The warning method of claim 1, wherein in the determining whether there is any direction light flashing in the left lane ROI, in the right lane ROI and in the ego-lane ROI, a image sensor is used for detecting whether any of the direction lights of a vehicle approaching from the rear of the ego-vehicle is flashing.

12. The warning method of claim 1, wherein in the determining whether there is any direction light flashing in the left lane ROI, in the right lane ROI and in the ego-lane ROI, an alarm unit is used for issuing the corresponding alarm signal.

13. A warning system for detecting lane-changing condition of rear-approaching vehicles, comprising:
a signal process-control module comprising;
an image acquisition and decoding unit , a random access memory, an image coding and outputting unit, a signal processing and control unit, and a non-volatile programmable memory;
an image sensor, electrically connected to the signal process-control module;
a control unit, electrically connected to the signal process-control module;
a display unit, electrically connected to the signal process-control module; and
an alarm unit, electrically connected to the signal process-control module;
wherein the signal process-control module is used for processing the rear-view image from the image sensor using a Sobel filter so as to identify edges of lanes that are to be used in a Hough transform operation for obtaining position information of the lane lines in the image coordinate system; and further, with reference to the positions $(x_i, y_i)$ of the lane lines detected in the image coordinate system, the signal process-control modules uses the following inverse perspective projection equations:

$$x_v = \frac{\left(x_i - \frac{x_{size}}{2}\right)(z_v\cos\theta + H\sin\theta)}{k_x}; \text{ and}$$

$$z_v = \frac{H\left(k_y\cos\theta - \left(y_i - \frac{y_{size}}{2}\right)\sin\theta\right)}{\left(k_y\sin\theta - \left(y_i - \frac{y_{size}}{2}\right)\cos\theta\right)};$$

whereas, H is the height of the image sensor;
$x_{size}$ is the width of the rear-view image;
$y_{size}$ is the height of the rear-view image;
$k_x$ is a scale factor in x-axis direction;
$k_y$ is a scale factor in y-axis direction; and
$\theta$ is the tilt angle between the orientation of the image sensor and the ground level;
for obtaining positions $(x_v, z_v)$ of the lane lines in the vehicle coordinate system; and then the $(x_v, z_v)$ of the lane lines in the vehicle coordinate system and the expected height $y_v$ of any common direction light are provided to the signal process-control module for performing the following perspective projection equations:

$$x_L = \frac{x_{size}}{2} + \frac{x_v k_x}{-y_v\sin\theta + z_v\cos\theta + H\sin\theta}; \text{ and}$$

$$y_L = \frac{y_{size}}{x} + k_y \frac{y_v\cos\theta + z_v\sin\theta - H\cos\theta}{-y_v\sin\theta + z_v\cos\theta + H\sin\theta};$$

for obtaining the positions $(x_L, y_L)$ of the edges of the adaptive lane lines, in the image coordinate system so as to be used for obtaining the left lane ROI, the right lane ROI and the ego-lane ROI.

14. The warning system of claim 13, wherein the image sensor is an optical sensing device selected from the group consisting of: an infrared image capturing device, a charge coupled device (CCD) and a complementary metal oxide semiconductor (CMOS).

15. The warning system of claim 13, wherein the image sensor is electrically connected to the signal process-control module through a transmission interface, and the transmission interface is an interface selected from the group consisting of: an analog interface and a digital interface.

16. The warning system of claim 15, wherein the transmission interface is an interface selected from the group consisting of: an analog composite video interface, and a digital low-voltage differential signal (LVDS) interface.

17. The warning system of claim 13, wherein an alarm signal generated by the alarm unit is a signal selected from the group consisting of: a sound signal, a light signal, a vibration signal and the combinations thereof.

18. The warning system of claim 13, wherein the signal process-control module further comprises: a Sobel filter, and is equipped with the abilities of Hough transform operation and logical decision operation.

19. The warning system of claim 13, wherein the control unit is used for activating the image sensor, the signal process-control module, the display unit and the alarm unit; the image acquisition and decoding unit is used for converting images that are captured by the image sensor into digital data capable of being processed by the signal processing and control unit; the random access memory is used for storing digital data transmitted from the signal processing and control unit; the image coding and outputting unit is used for receiving and coding data from the random access memory into image data while outputting the same to the display unit for displaying; and the non-volatile programmable memory is used for storing the image data, a data for configuration, and a data for updating.

\* \* \* \* \*